United States Patent
van Lammeren et al.

(10) Patent No.: US 9,035,619 B2
(45) Date of Patent: May 19, 2015

(54) BATTERY CELL TEMPERATURE DETECTION

(75) Inventors: Johannes van Lammeren, Beuningen (NL); Matheus Johannus Gerardus Lammers, Nederweert (NL)

(73) Assignee: DATANG NXP SEMICONDUCTORS CO., LTD., Jiangsu (CN)

( * ) Notice: Subject to any disclaimer, the term of this patent is extended or adjusted under 35 U.S.C. 154(b) by 487 days.

(21) Appl. No.: 13/555,923

(22) Filed: Jul. 23, 2012

(65) Prior Publication Data

US 2013/0314049 A1 Nov. 28, 2013

Related U.S. Application Data (60) Provisional application No. 61/651,039, filed on May 24, 2012.

(51) Int. Cl.
| | |
|---|---|
| H02J 7/00 | (2006.01) |
| H02J 7/04 | (2006.01) |
| H02J 7/16 | (2006.01) |
| H01M 14/00 | (2006.01) |
| G01K 1/02 | (2006.01) |
| G01K 7/26 | (2006.01) |

(52) U.S. Cl.
CPC ........ *G01K 1/026* (2013.01); *G01K 7/26* (2013.01); *G01K 2205/00* (2013.01); *G01K 2217/00* (2013.01)

(58) Field of Classification Search
CPC ........... G01R 31/3662; G01R 31/3651; G01R 31/3679; G01R 31/3624; G01R 31/3634; G01R 31/3689; B60L 2240/545; B60L 3/0046; H01M 10/48; H01M 10/486; H02J 7/007; Y02E 60/122
USPC .............................. 320/134, 150–154; 429/7
See application file for complete search history.

(56) References Cited

U.S. PATENT DOCUMENTS

| | | | |
|---|---|---|---|
| 2007/0090843 A1* | 4/2007 | De Doncker et al. ......... | 324/426 |
| 2012/0032639 A1* | 2/2012 | Kim et al. ..................... | 320/112 |
| 2012/0105070 A1* | 5/2012 | van Lammeren et al. .... | 324/430 |
| 2013/0307487 A1* | 11/2013 | Matthe et al. ................. | 320/152 |

OTHER PUBLICATIONS

Hong, Y-J., et al. "Modeling of the Thermal Behavior of a Lithium-Ion Battery Pack," Advanced Automotive Battery Conference, 4 pgs. (2010).

* cited by examiner

*Primary Examiner* — Samuel Berhanu
*Assistant Examiner* — Moustafa Khalil
(74) *Attorney, Agent, or Firm* — Foley & Lardner LLP (57) ABSTRACT

Temperature characteristics of battery cells are detected. In accordance with one or more embodiments, an intercept frequency is detected for each battery cell, at which frequency an imaginary part of a plot of impedance values of the battery cell exhibits a zero crossing. The impedance values correspond to current injected into the cell. A temperature of the cell is determined based upon the detected intercept frequency for the cell and stored data that models operation of the cell. Various approaches are implemented with different types of circuits coupled to detect the impedance values of the respective cells.

20 Claims, 5 Drawing Sheets

BATTERY CELL TEMPERATURE DETECTION

This patent document claims benefit under 35 U.S.C. §119 to U.S. Provisional Patent Application Ser. No. 61/651,039, entitled "Battery Cell Temperature Measurement Arrangement" and filed on May 24, 2012, which is fully incorporated herein by reference.

Aspects of various embodiments of the present invention are directed to temperature detection, and to such detection in battery cells.

For a variety of battery cells, such as used in battery systems for hybrid/electric vehicles, the properties and behavior of a battery cell strongly depend on its temperature. For instance, at very high or low temperatures, the current drive and charge acceptance capabilities can be reduced. If the load on or a charger for the cell does not take this effect into account, the lifetime of the cell may be severely reduced.

However, determining the temperature of a battery can be challenging. For instance, it is difficult to ascertain where the temperature would be best measured. In addition, as large battery cells have a high (thermal) mass, it may take some time before a temperature change inside the cell can be measured on an accessible location at an outside portion of the cell (time is needed for the temperature to equalize).

As battery properties and ageing effects are temperature-dependent, the temperature of each cell is desirably known to within 1K. Obtaining this measurement accuracy is challenging if not sensed inside the chemically active part of the cell. In addition, measuring temperature becomes more complex in large battery packs with many series-connected cells, such as for those used in electric vehicles. Generally, the weakest cell determines the pack's capacity and current drive capabilities. However, at different temperatures, different cells may be the weakest. While thermal models can be used to identify individual cell temperatures, such a model can be difficult to implement. In addition, while different sensors can be used for each battery cell, such an approach can be cost-prohibitive and otherwise challenging to implement.

These and other matters continue to present challenges to the monitoring of battery cell temperature and other characteristics, for a variety of applications.

Various example embodiments are directed to battery cell temperature detection, to related circuits/modules and their implementation.

According to an example embodiment, temperature in each of a plurality of battery cells is detected as follows, for each cell. An intercept frequency is detected, the intercept frequency being a frequency at which an imaginary part of a plot of impedance values of the battery cell exhibits a zero crossing, with the impedance values corresponding to current injected into the cell. A temperature of the cell is determined based upon the detected intercept frequency for the cell and stored data that models operation of the cell. In some implementations, the intercept frequency and temperature detection are respectively carried out in an intercept detection circuit and a temperature detection circuit, in such circuit modules, and/or in a circuit operating such modules as including processing circuitry and stored instructions for the operation of the processing circuitry.

Another embodiment is directed to a battery apparatus including an impedance detection circuit, a zero-crossing circuit, a mapping circuit and a temperature detection circuit, each of which may be implemented separately or in combination. The impedance detection circuit is connected to a plurality of battery cells and detects impedance values at different frequencies for each cell. The zero-crossing circuit operates for each cell by using the detected impedance values to determine a frequency of a zero crossing point of an imaginary part of an impedance curve for the cell. The mapping circuit maps the frequency of the zero crossing point to a model for each cell, and the temperature detection circuit generates an indication of a temperature characteristic of the cell based on the map for the cell.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While various embodiments discussed herein are amenable to modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure, including aspects defined in the claims. In addition, the term "example" as used throughout this document is only by way of illustration, and not limitation.

Aspects of the various embodiments described herein are believed to be applicable to a variety of different types of apparatuses, systems and methods involving temperature measurement with battery cells. While the present invention is not necessarily so limited, various aspects may be appreciated through a discussion of examples using this context.

Various example embodiments are directed to detecting temperature characteristics of battery cells based upon behavior of the cells. In various implementations, impedance behavior of the cell in the frequency domain is monitored and used to provide an indication of temperature. In certain embodiments, this behavior is monitored over time, and used to characterize temperature characteristics as the battery cell ages. Certain embodiments are directed to controlling the operation of such cells based upon the temperature characteristics.

In a more particular embodiment, the intercept frequency of an imaginary portion of detected impedance is used to estimate cell temperatures (e.g., without necessarily obtaining and/or using an entire Nyquist plot). Cell impedance is detected at two or more frequencies, and used to determine or otherwise detect an intercept frequency at which an imaginary portion of a detected impedance is about zero (at a zero crossing point), which is indicative of an actual (real) frequency. In some embodiments, interpolation is used with the two points to approximate a zero crossing point. In certain embodiments, the cell impedance is measured at a first (e.g., arbitrary) frequency. If the imaginary part of the impedance is positive, then impedance is detected at a higher frequency. If the imaginary part of the impedance is negative impedance is detected at a lower frequency next. This procedure is repeated until the imaginary part of the impedance is (nearly) zero.

In some embodiments, one or more such approaches are implemented using a Nyquist plot of a battery cell that depicts the real and imaginary parts of the cell's impedance as a function of the frequency. For instance, low frequencies (e.g., the mHz range) in the Nyquist plot can be used to as an indication of diffusion effects in the battery cell, mid frequencies (e.g., the Hz range) can be used as an indication of cell kinetics, and high frequencies (e.g., the kHz range) can be used as an indication of mechanical cell construction. Frequency aspects are mapped on components of a cell model and used to provide an indication of temperature in the cell.

Various embodiments are directed to implementation with existing circuitry modified appropriately (e.g., operating upon instructions executed to effect appropriate operation), such as in a cell supervisor circuit. For general information regarding battery cells, and for specific information regarding manners in which individual cell impedances can be measured in a long chain of series-connected cells, reference may be made to each of the following, all of which are fully incorporated herein by reference: Hong, Y-J. et al. "Modeling of the Thermal Behavior of a Lithium-Ion Battery Pack", Advanced Automotive Battery Conference, 4 pgs. (2010); U.S. Patent Application Publication No. 2012/0105070 (van Lammeren, J. P. M. et al. "Spectroscopic Battery-Cell-Impedance Measurement Arrangement for Large Battery Packs Using the Cell Balancing Current"); U.S. patent application Ser. No. 13/100,652 (Lammers, M. J. G. "Method to Measure the Impedances of Battery Cells in a (H)EV Application"); and U.S. patent application Ser. No. 13/150,959 (van Lammeren, J. P. M. et al. "DFT-Based Battery-Cell-Impedance Measurement Arrangement for High-Voltage Battery Packs").

Using approaches as discussed herein, the temperature of the battery cell chemistry itself can be measured, addressing issues relating to the measurement of the temperature of a component such as a cell casing, from which the temperature of the chemistry is estimated, and mitigating measurement error issues with respect to the thermal resistance between the chemistry and the temperature sensor. Further, an instantaneous temperature can be measured, as there is no time delay between heating of the battery cell and the sensed temperature, mitigating issues with delays caused by the thermal time constant. Measurement may be obtained without implementing complex battery pack models and software routines. In addition, the measured temperature is the average temperature of the cell's chemistry, mitigating issues with measuring a single position in a cell, which can lead to errors as internal temperature gradients arise, especially under heavy load and if the battery pack has an active cooling system. Further, measurements can be made without waiting for the battery to settle in a "chemically steady state" as the intercept frequency is above the frequency range where chemical time-constants play a role.

Figure 1:
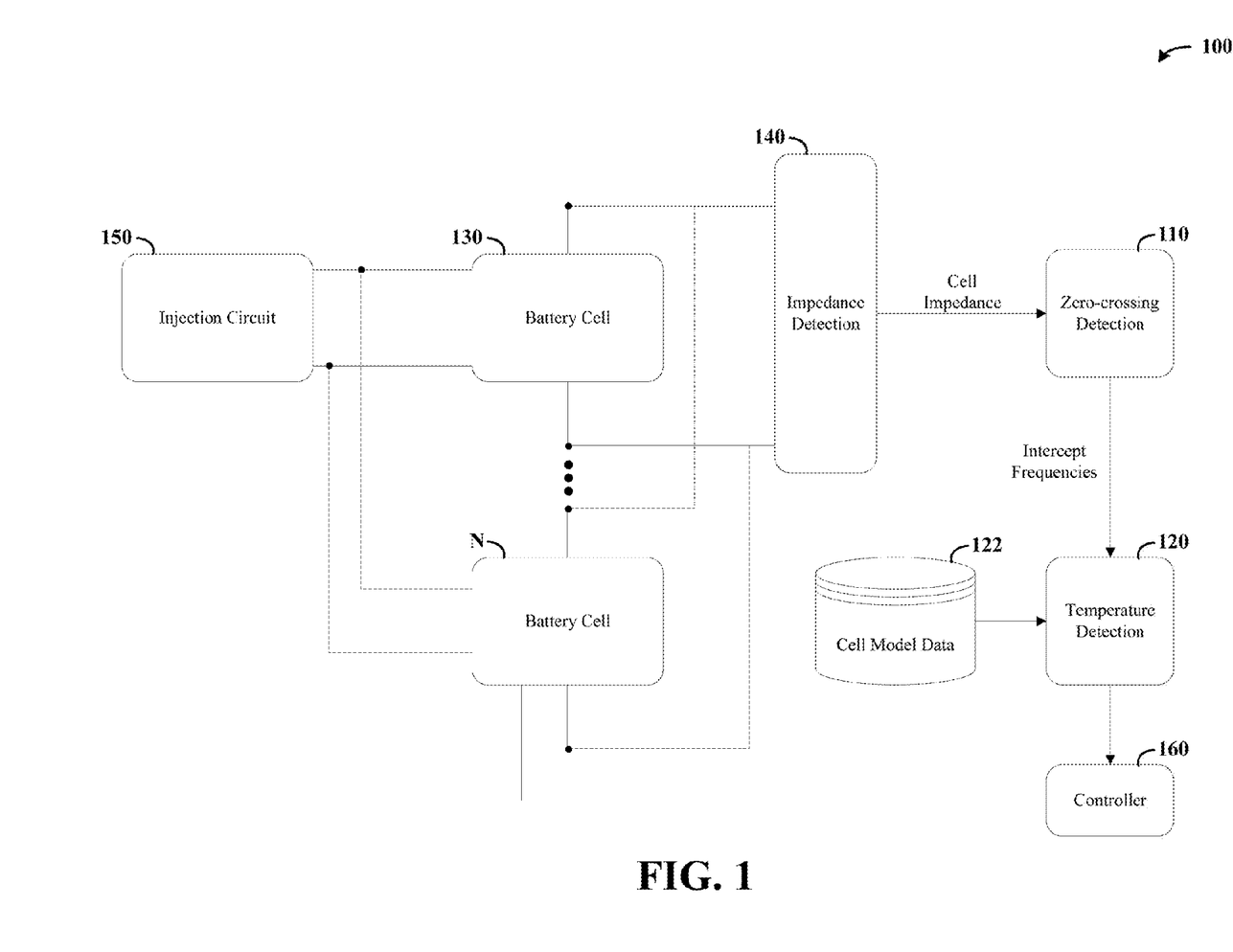
FIG. 1 shows a temperature detection apparatus, in accordance with one or more embodiments.

Turning now to the figures, FIG. 1 shows an apparatus 100, including a zero crossing detection circuit 110 and a temperature detection circuit 120. By way of example, the apparatus 100 is shown as coupled to receive impedance values for each of a plurality of battery cells 130-N, via an impedance detection circuit 140. The zero crossing detection circuit 110 detects an intercept frequency for each battery cell. The intercept frequency is a frequency at which an imaginary part of a plot of impedance values of the battery cell exhibits a zero crossing (or nearly a zero crossing), in which the impedance values correspond to current injected into the cell, as represented via current injection circuit 150 (e.g., using an imaginary part of a partial Nyquist plot of the impedance to determine the frequency of the zero crossing point).

The temperature detection circuit 120 determines a temperature of each cell based upon the detected intercept frequency for the cell and stored data that models operation of the cell (e.g., stored at data storage circuit 122), and provides an output that can be used in controlling operation of the battery cells. In one such instance, controller 160 uses the detected temperature to control at least one of charging and discharging the battery cells 130-N as connected in series.

In some embodiments, the apparatus 100 also includes one or more of the impedance detection circuit 140, current injection circuit 150, data storage circuit 122 and controller 160. In other embodiments, such circuits are present in a battery pack system to which the apparatus 100, including the zero crossing detection circuit 110 and temperature detection circuit 120, is coupled. Accordingly, various embodiments are directed to implementations as add-on functionality and/or to larger systems for monitoring and/or controlling battery packs. In certain implementations, the zero-crossing detection circuit 110 controls the current injection circuit 150 to inject current at certain frequencies. In other implementations, the current injection circuit 150 is part of the apparatus 100 and controls the injection frequencies in conjunction with operation of the zero-crossing detection circuit 110.

In a more particular embodiment, the current injection circuit 150 is operated to inject current into the cells 130-N at different frequencies. The zero crossing detection circuit detects the intercept frequency by interpolating respective impedance values of the cell detected in response to the injection of the current at the different frequencies. Such interpolation may, for example, involve a linear interpolation, using plots such as those shown in FIG. 4. In some embodiments, current signals are concurrently injected into each cell at different frequencies.

In certain instances, respective injection frequencies are set based upon an intercept frequency previously detected by the zero crossing detection circuit 110. At least one frequency that is higher than the previously-detected intercept frequency, and at least one frequency that is lower than the previously-detected intercept frequency, are respectively injected into the cells. In connection with these and other embodiments, it has been discovered that by injecting such frequencies, a linear interpolation can be used to identify a zero crossing point from which a temperature of the battery cell can be determined. Accordingly, the zero crossing detection circuit 110 detects the intercept frequency by interpolating respective impedance values of the cell detected in response to the injection of the current at the different frequencies.

In accordance with a more particular example embodiment, as may be implemented with the apparatus 100, an impedance detection circuit is connected to a plurality of battery cells and detects impedance values at different frequencies for each cell, and a zero-crossing circuit uses the detected impedance values for each cell to determine a frequency of a zero crossing point of an imaginary part of an impedance curve for that cell. The mapping circuit maps the frequency of the zero crossing point for each cell to a model for the cell, and a temperature detection circuit generates an indication of a temperature characteristic of the cell based on the map for the cell.

In some embodiments, the zero-crossing detection circuit 110 determines the frequency of the zero crossing point for each cell by detecting the cell impedance corresponding to cell operation at first and second different frequencies. A zero-crossing point is linearly interpolated for the cell using the impedances detected at the first and second frequencies. In some implementations, the impedance detection circuit 140 injects signals into the cell at the first and second frequencies, using frequencies that are respectively above and below an expected intercept frequency and therein facilitating the detection of a zero crossing point via linear interpolation therebetween. In a more particular implementation, the current for each frequency is injected concurrently, with the impedance detection circuit 140 operating to detect impedances at both frequencies (e.g., with the respective zero-crossing frequencies being detected at a rate higher than the inverse of the cell's thermal time constant).

The respective frequencies injected into battery cells are determined using one or more of a variety of approaches. In one such embodiment, the current injection circuit 150 operates to inject current at frequencies that are respectively above and below a frequency at which the zero-crossing detection circuit 110 has previously detected a zero-crossing. The respective frequencies may be selected, for example, such that the previously-detected zero-crossing frequency is about half-way between the respective frequencies, and therein facilitating the subsequent (possibly more accurate) detection of a zero crossing frequency.

In another embodiment, the zero-crossing detection circuit 110 determines the frequency of the zero crossing point for each cell by measuring the cell impedance at a first frequency, and subsequently measuring the cell impedance at a higher or lower frequency respectively, in response to the imaginary part of the impedance being positive or negative. These steps of measuring and responding to the sign of the imaginary part of the impedance are repeated until the imaginary part of impedance is about zero, which is then used in detecting a zero crossing point.

Interpolation of zero-crossing points is carried out in different manners, to suit different applications and/or desired accuracies and time/processing limitations. In some embodiments, a linear interpolation is carried out using impedances detected at two frequencies. In other embodiments, an interpolation (linear and/or non-linear) is carried out using three or more respective impedances of a particular cell, based upon current injected at different frequencies.

In some embodiments, the impedance detection circuit 140 accounts for variations in the cell as the cell ages. The circuit 140 detects a reference impedance of the cell under a first condition (e.g., before implementation of a new cell, or when the cell is relatively new) while the cell is at thermal equilibrium. After the cell has aged, the circuit 140 detects an aged impedance value using a signal injected into the cell while the cell is at thermal equilibrium. The detected impedance values and respective equilibrium temperatures are used to modify a model of the cell used to map detected impedances (zero crossing) with cell temperature.

The temperature detection circuit 120 operates to calibrate the apparatus 100, in accordance with one or more embodiments. In one such embodiment, the temperature detection circuit 120 calibrates a temperature measurement based on an output of a temperature sensor generated when a battery apparatus including the cells 130-N is in thermal equilibrium. With this approach, using the thermal equilibrium condition, a single temperature sensor can be used to make such a measurement.

Figure 2:
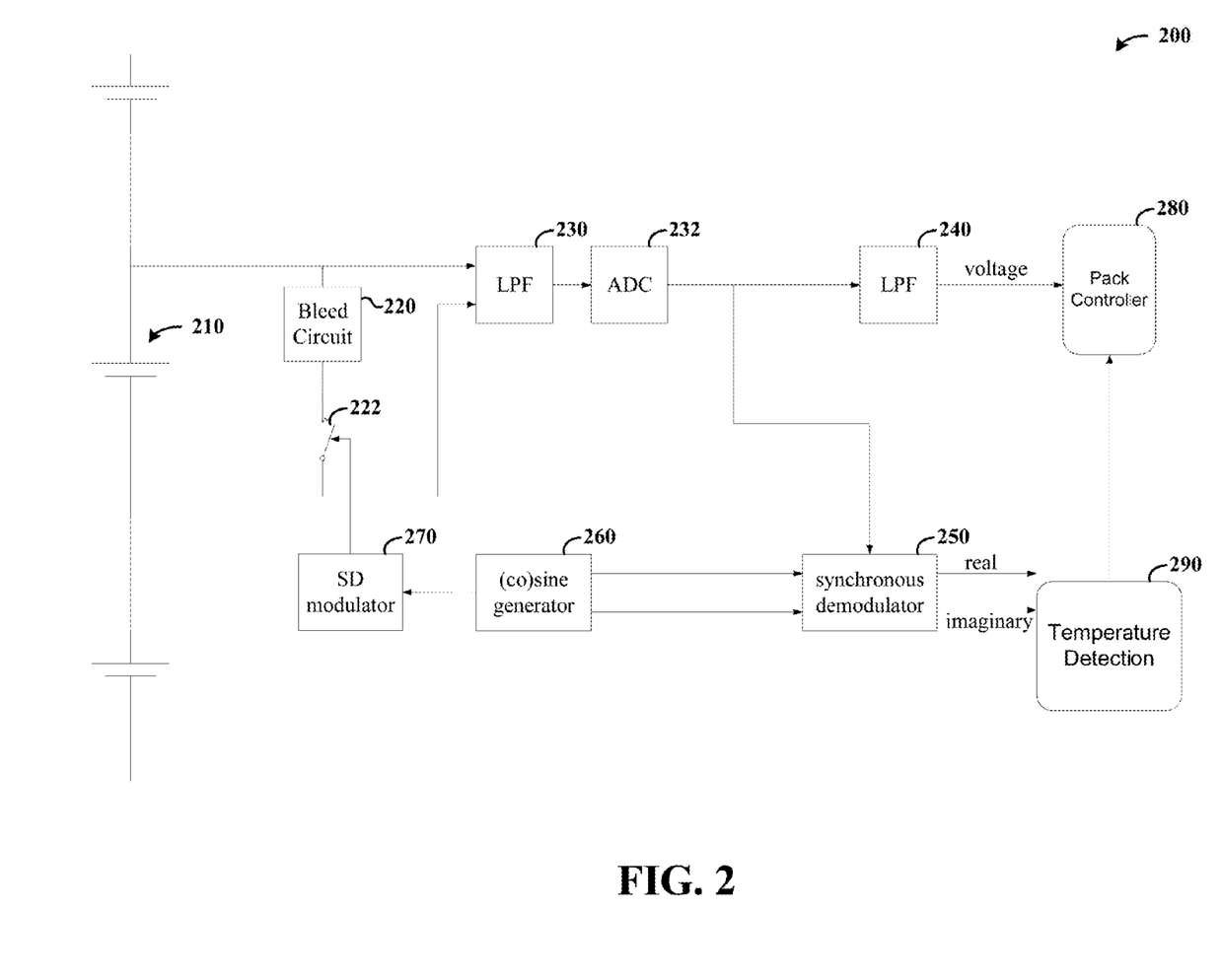
FIG. 2 shows a temperature detection apparatus, in accordance with one or more embodiments.

FIG. 2 shows a temperature detection apparatus 200, in accordance with one or more embodiments. The apparatus 200 uses a relationship between temperature and cell impedance to ascertain respective temperatures of each of a plurality of battery cells including cell 210, across which a bleed circuit 220 (e.g., a resistor or a current source) and corresponding switch 222 are coupled. The apparatus 200 includes anti-alias filters 230 and 240, and an analog-to-digital converter (ADC) 232 that measures cell voltage (shown coupled to cell 210), providing cell voltage for use in characterizing a cell impedance characteristic.

The output of ADC 232 is also coupled to a synchronous demodulator 250, which receives a signal from (co)sine generator 260, which also provides an output signal to sigma-delta modulator 270 for use in controlling operation of the switch 222. The (co)sine generator 260 and sigma-delta modulator 270 thus control the injection of current into the cell 210 by providing a modulated signal (e.g., a pulse-density modulation (PDM) modulated signal) to the switch 222, with the modulation set to inject current at a desired signal frequency. A variety of (co)sine generators can be implemented in connection with these and other embodiments. For general information regarding such generators, and for specific information regarding DFT generators that may be implemented in connection with these embodiments, reference may be made to U.S. patent application Ser. No. 13/100,652, entitled "Method to measure the impedances of battery cells in a (H)EV application", and filed on May 4, 2011, which is fully incorporated herein by reference.

A pack controller 280 uses the voltage output from anti-alias filter 240 for controlling the battery cells, which may be implemented as part of the apparatus 200, or separately in which apparatus 200 provides an output for use by the pack controller. The synchronous demodulator 250 provides an output indicative of an imaginary portion of the output of the ADC, as corresponding to impedance of the cell 210, to a temperature detection circuit 290.

The temperature detection circuit 290 uses the detected impedance at different frequencies to identify a zero-crossing point of the imaginary output as discussed herein, and further uses the frequency of the identified zero crossing point together with a model of the cell operation to determine a temperature characteristic of the cell. The temperature detection circuit 290 provides an output to the pack controller 280, for use in controlling operation of the cell 210. In some implementations, the temperature detection circuit 290 also controls operation of the sigma-delta modulator 270 for controlling the frequency of current injection into the cell 210, such as described herein. Accordingly, the apparatus 200 may be operated in one or more manners as described herein, such as in connection with FIG. 1, for detecting/determining the temperature of cell 210 and other cells in a corresponding battery pack.

Figure 3:
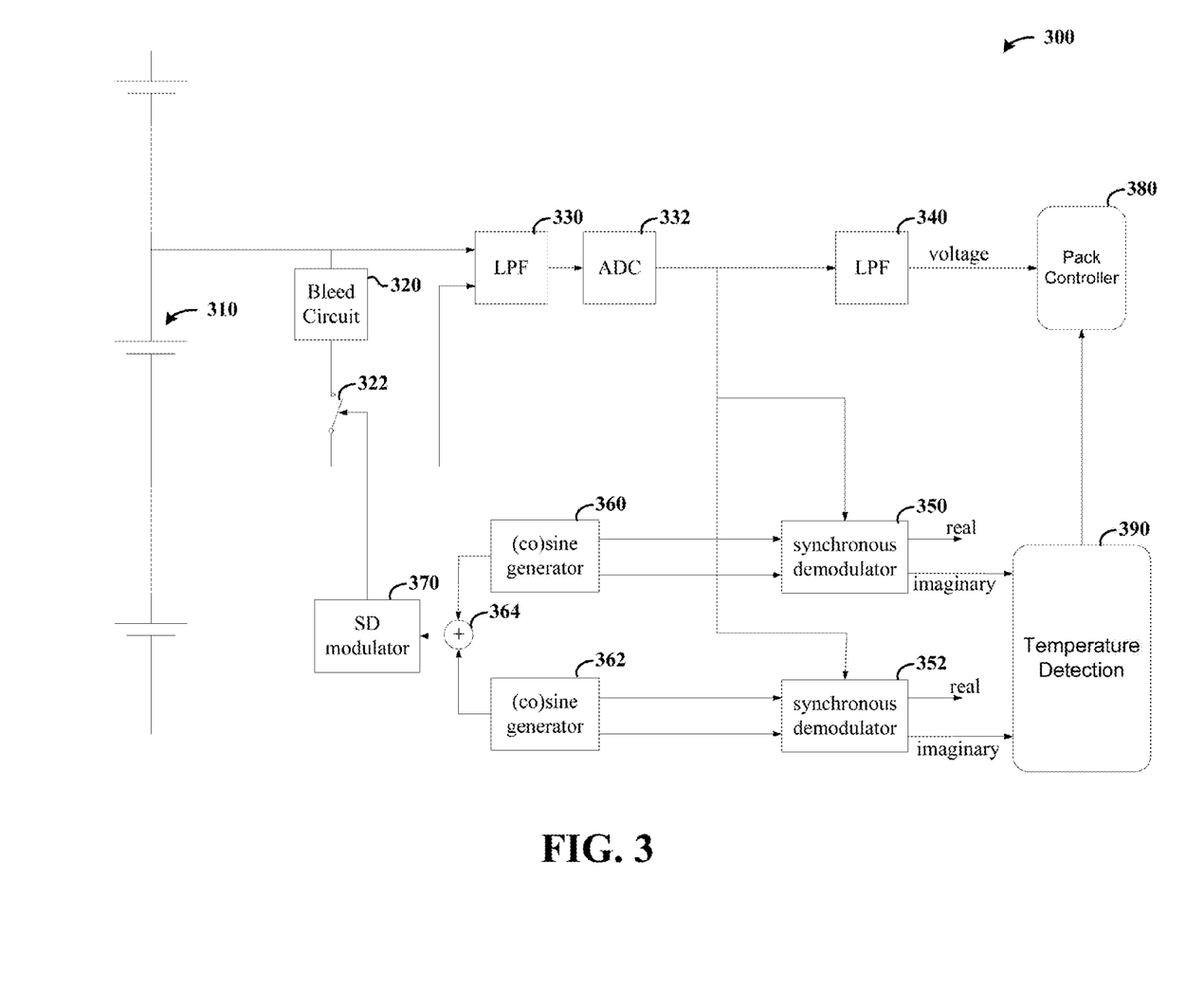
FIG. 3 shows a temperature detection apparatus, in accordance with one or more embodiments.

FIG. 3 shows a temperature detection apparatus 300, in accordance with one or more embodiments. The apparatus 300 is similar to the apparatus 200 shown in FIG. 2 and described above, and thus uses similar reference numerals for simplicity, and further provides for concurrent injection of two currents at different frequencies. However, the components in the embodiments shown in FIGS. 2 and 3 may be implemented using different and/or similar circuitry and related approaches. The apparatus 300 also operates upon a plurality of battery cells including cell 310, and includes bleed circuit 320 (e.g., a resistor or current source), switch 322, anti-alias filters 330 and 340, ADC 332, synchronous demodulator 350, (co)sine generator 360, and sigma-delta modulator 370, which controls operation of the switch 322 for current injection, such as discussed above. The apparatus 300 further includes synchronous demodulator 352 and (co)sine generator 362, the output of which is added to the output of (co)sine generator 360 at adder 364, which provides the sum to the sigma-delta modulator 370 and therein facilitates the injection of different currents at the same time. Apparatus 200 may be implemented to do so in a time-multiplexed approach. Pack controller 380 uses the voltage output from anti-alias filter 340 for controlling the battery cells, which may be implemented as part of the apparatus 300, or separately in which apparatus 300 provides an output for use by the pack controller. The synchronous demodulators 350 and 352 provide an output indicative of an imaginary portion of the output of the ADC, as corresponding to impedance of the cell 310, to a temperature detection circuit 390.

Temperature detection circuit 390 uses the detected impedance at different frequencies to identify a zero-crossing point of the imaginary output as discussed herein, and further uses the frequency of the identified zero crossing point, together with a model of the cell operation, to determine a temperature characteristic of the cell. The temperature detection circuit 390 provides an output to the pack controller 380, for use in controlling operation of the cell 310. As with the above, in some implementations, the temperature detection circuit 390 also controls operation of the sigma-delta modulator 370 (and/or (co)sine generators 360/362) for controlling the frequency of current injection into the cell 310, such as described herein. Accordingly, the apparatus 300 may be operated in one or more manners as described herein, such as in connection with FIG. 1, for detecting/determining the temperature of cell 310 and other cells in a corresponding battery pack.

As discussed above, the apparatus 300 can be implemented for injecting two currents at two different measurement frequencies (either simultaneous or successive). Such an approach can be implemented such that an intercept point found in a previous measurement is halfway between the two frequencies. This approach is implemented by measuring the temperature at a rate higher than the inverse of the thermal time constant of battery cell 310.

The various embodiments described herein are implemented in a variety of manners, to suit particular applications. In some implementations, the intercept point is at a frequency higher than the speed of kinetics and diffusion effects, such that a test signal can be injected irrespective of non-linearity and settling behavior caused by these effects. In certain embodiments, the cleanliness of the spectrum is checked by measuring one cell without injecting any signal. Such an approach may be implemented in accordance with one or more approaches as discussed in U.S. patent application Ser. No. 13/150,959, which is fully incorporated herein by reference.

Figure 4:
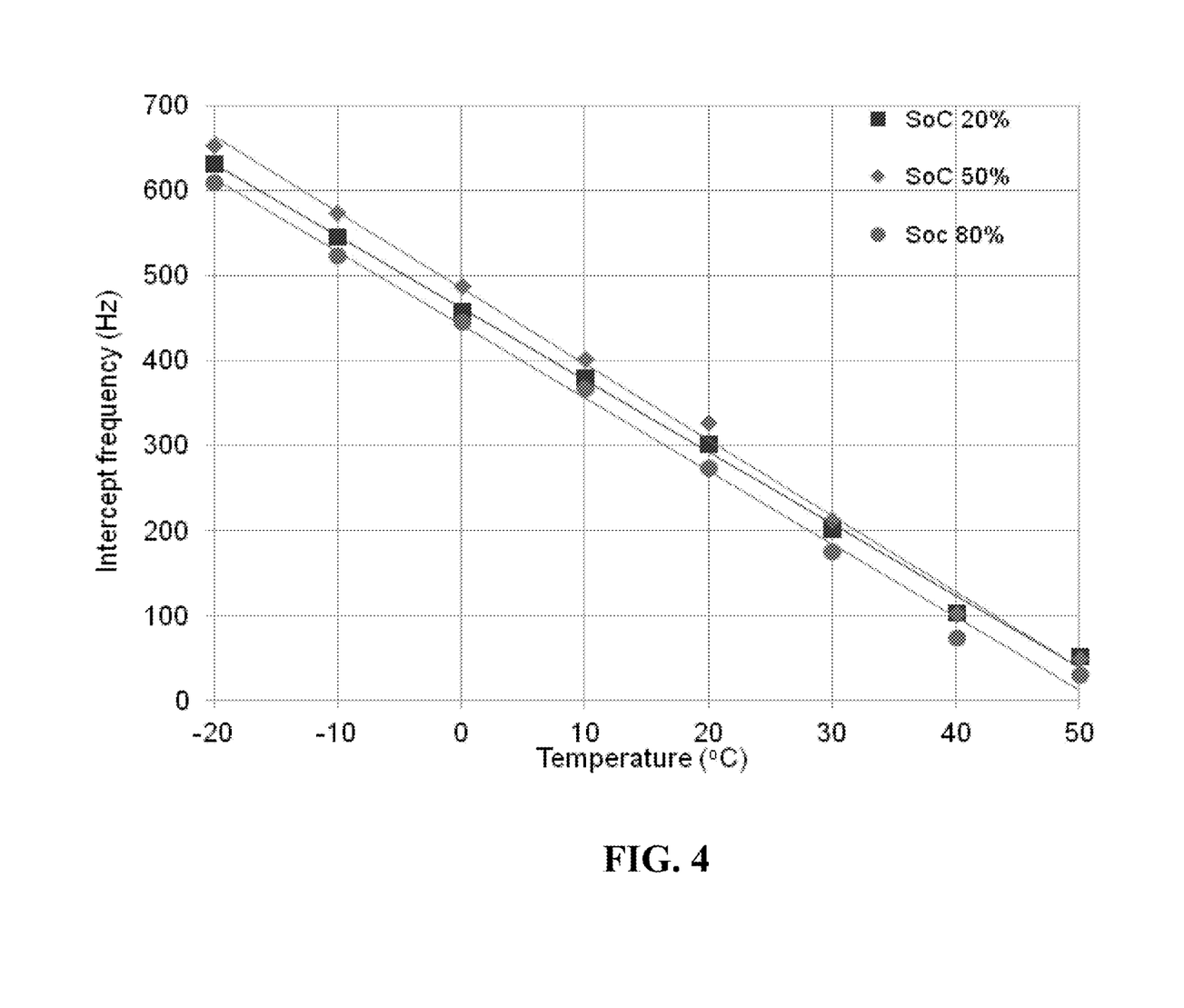
FIG. 4 shows a plot of temperature versus intercept frequency for different state of charge (SoC) conditions as used in the control of battery cells, in accordance with one or more embodiments.

FIG. 4 shows a plot of temperature versus intercept frequency for different state of charge (SoC) conditions (e.g., for a Li-ion battery) as used in the control of battery cells in accordance with one or more embodiments. As consistent with the above, such a plot can be used to correlate detected intercept frequencies with temperature. Further, via calibration and different values of SoC, the temperature is accurately determined.

Figure 5:
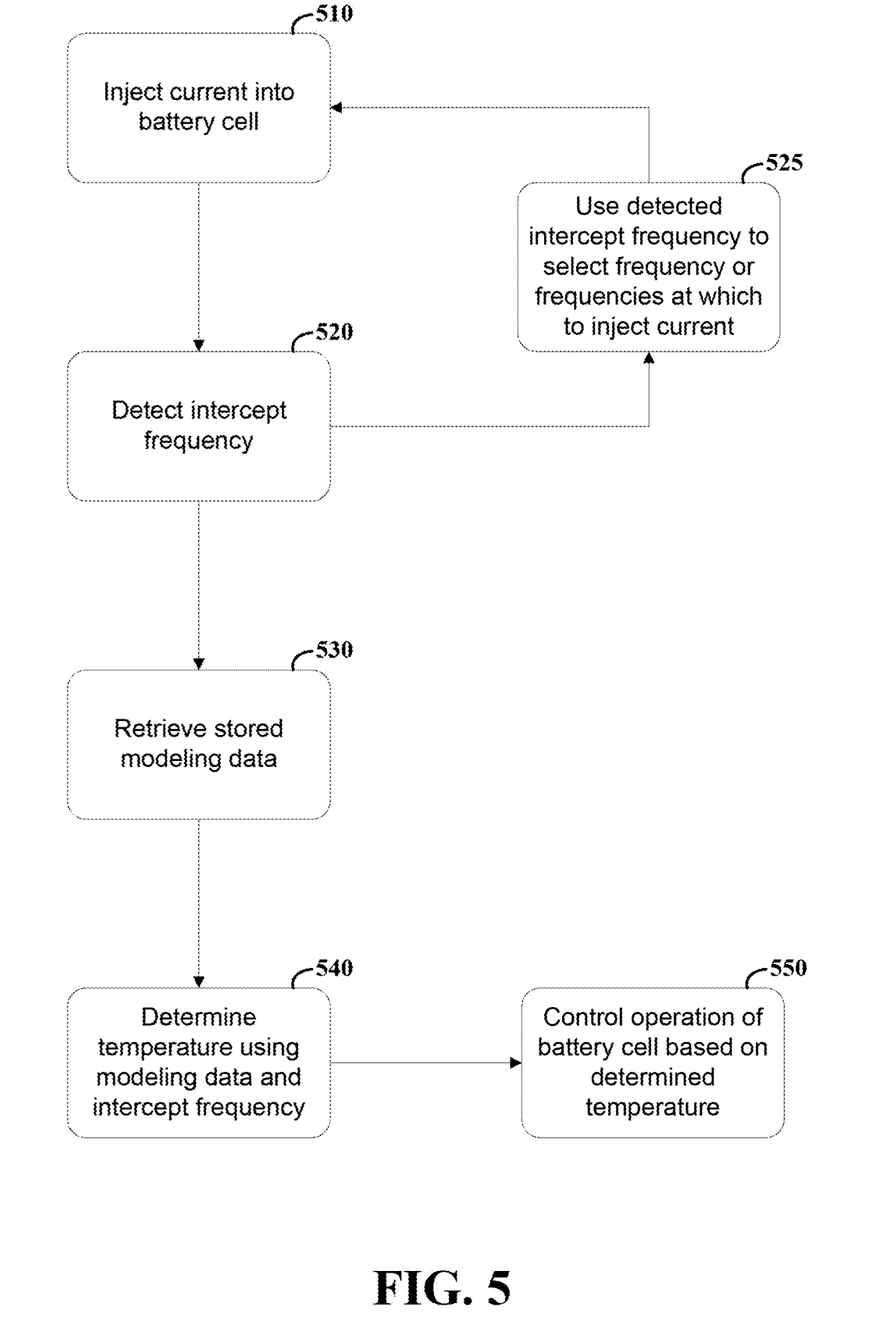
FIG. 5 shows a data flow diagram as implemented for temperature detection, in accordance with one or more embodiments.

FIG. 5 shows a data flow diagram as implemented for temperature detection in a battery apparatus having a plurality of battery cells, in accordance with one or more embodiments. At block 510, current is injected into a battery cell, such as by injecting a single frequency current or current signals at different frequencies as described herein. At block 520, an intercept frequency is detected, at which an imaginary part of a plot of impedance values of the battery cell exhibits a zero crossing. The impedance values correspond to the current injected into the cell at block 510, and can be used to infer/interpolate the intercept frequency at block 520. At block 530, stored data modelling operation of the cell is retrieved, and the retrieved data is used at block 540 with the detected intercept frequency to determine a temperature of the cell.

In various embodiments, the detected intercept frequency is used at block 525 to select frequencies at which to inject current for subsequent intercept frequency detection. For instance, as consistent with the above, an embodiment is directed to selecting current injection frequencies above and below the detected intercept frequency, injecting current at the selected frequencies and using the resulting detected impedance to interpolate an intercept frequency at block 520. Another embodiment is directed to selecting a current injection frequency at block 525 based upon the sign of an imaginary part of an impedance detected upon injection of the current at block 510, in injecting current at a higher frequency when the value is positive and injecting current at a lower frequency when the value is negative.

The temperature detected at block 540 is used to control operation of the battery cell at block 550, in one or more of a variety of manners. For instance, the determined temperature of each cell can be used to control at least one of charging, discharging, and drawing energy from each of a plurality of battery cells. This approach can be used to balance load or otherwise desirably operate battery cells, based on their operation and related performance over time.

The implementation of the various approaches herein as shown in the figures and described in the text and claims is effected in one or more manners, such as to suit particular applications. In some implementations, battery cells are controlled using software-based control on a battery pack-controller, software-based control on the cell supervisor, and control with a Finite State Machine (FSM) on a cell supervisor. Current can be injected as shown in FIGS. 2 and 3, at the cell level (e.g., through a cell balancer), and via modulation of motor current of a motor driven by the battery cells (e.g., in an automotive application). The measured impedance is used in a variety of manners, such as to successively approximate via multiple measurements using a single frequency, interpolation of data of a single measurement using multiple frequencies, and interpolation of data of multiple measurements using a single frequency.

Various modules may be implemented to carry out one or more of the operations and activities described herein and/or shown in the figures. In these contexts, a "module" is a circuit that carries out one or more of these or related operations/activities (e.g., interpolating values based upon detected impedance, determining a temperature base upon the interpolation). For example, in certain of the above-discussed embodiments, one or more modules are discrete logic circuits or programmable logic circuits configured and arranged for implementing these operations/activities, as in the circuit modules shown in FIG. 1. Such modules may, for example, be implemented as part of a battery pack controller and/or a battery cell supervisor. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, certain modules include a combination of a CPU hardware-based circuit and a set of instructions in the form of firmware. In such an example, a first module may include a CPU hardware circuit with one set of instructions and a second module may include a second CPU hardware circuit (or the same CPU hardware circuit) with another set of instructions.

Certain embodiments are directed to a computer program product (e.g., nonvolatile memory device), which includes a machine or computer-readable medium having stored thereon instructions which may be executed by a computer (or other electronic device) to perform operations/activities as described herein.

Based upon the above discussion and illustrations, those skilled in the art will readily recognize that various modifications and changes may be made to various embodiments without strictly following the exemplary embodiments and applications illustrated and described herein. For example, a variety of different types of circuits may be used to detect impedance values for the battery cells, with an output thereof used in detecting related temperature characteristics. Such modifications do not depart from the true spirit and scope of the embodiments, including those set forth in the following claims.

What is claimed is:

1. A battery apparatus comprising:
    an impedance detection circuit connected to a plurality of battery cells and configured and arranged to detect impedance values at different frequencies for each cell;
    a zero-crossing circuit configured and arranged to, for each cell, use the detected impedance values to determine a frequency indicative of a zero crossing point of an imaginary part of an impedance curve for the cell;
    a mapping circuit configured and arranged to, for each cell, map the frequency indicative of the zero crossing point to a model for the cell, and
    a temperature detection circuit configured and arranged to, for each cell, generate an indication of a temperature characteristic of the cell based on the map for the cell.

2. The apparatus of claim 1, wherein the zero-crossing circuit is configured and arranged to determine the frequency indicative of the zero crossing point for each cell by
    detecting the cell impedance while injecting current into the cell at a first frequency,
    detecting the cell impedance while injecting current into the cell at a second frequency that is different than the first frequency,
    linearly interpolating a zero-crossing point for the cell using the cell impedance detected at the first frequency and the cell impedance detected at the second frequency.

3. The apparatus of claim 2, wherein the impedance detection circuit is configured and arranged to inject signals into the cell at the first and second frequencies that are respectively above and below an expected intercept frequency.

4. The apparatus of claim 2, wherein the impedance detection circuit is configured and arranged to, for each cell, concurrently inject signals into the cell at the first and second frequencies.

5. The apparatus of claim 2, wherein the impedance detection circuit is configured and arranged to, for each cell, select the first and second frequencies using a zero-crossing frequency previously detected by the zero-crossing circuit, the previously-detected zero-crossing frequency being about halfway between the selected first and second frequencies, and to inject signals into the cell at the first and second frequencies.

6. The apparatus of claim 2, wherein the impedance detection circuit is configured and arranged to, for each cell, select the first and second frequencies using a previously-detected zero-crossing frequency, the previously-detected zero-crossing frequency being about halfway between the selected first and second frequencies, and to inject signals into the cell at the first and second frequencies, the respective zero-crossing frequencies being detected at a rate higher than an inverse of a thermal time constant of the cell.

7. The apparatus of claim 1, wherein the zero-crossing circuit is configured and arranged to determine the frequency of the zero crossing point for each cell by
    detecting at least three respective impedances of the cell while injecting current into the cell at different frequencies,
    using the detected impedances, interpolating a curve and determining a zero-crossing point for the cell using the interpolated curve.

8. The apparatus of claim 1, wherein the zero-crossing circuit is configured and arranged to determine the frequency indicative of the zero crossing point by, for each cell,
    measuring the cell impedance at a first frequency,
    in response to the imaginary part of the impedance being positive, measuring the cell impedance at a frequency higher than the first frequency,
    in response to the imaginary part of the impedance being negative, measuring the cell impedance lower than the first frequency,
    repeating the steps of measuring and responding to the imaginary part of the impedance until an imaginary part of impedance is about zero, and therein detecting a zero crossing point at the frequency at which the imaginary part of impedance is about zero.

9. The apparatus of claim 1, wherein the temperature detection circuit is configured and arranged to calibrate a temperature measurement based on an output of a temperature sensor generated when the battery apparatus is in thermal equilibrium.

10. The apparatus of claim 1, wherein the zero-crossing circuit is configured and arranged to determine the frequency indicative of the zero crossing point by generating a portion of a Nyquist plot for the cell using the detected impedances, and using an imaginary part of the Nyquist plot to determine the frequency of the zero crossing point.

11. The apparatus of claim 1, wherein the impedance detection circuit is configured and arranged to
    inject a signal into the cell and detect a first impedance of the cell when the battery apparatus is in thermal equilibrium,
    after the first impedance has been detected and the cell has aged, inject a signal into the cell and detect a second impedance value when the battery apparatus is in thermal equilibrium, and
    modify the model for the cell based upon the first impedance, the second impedance, and a temperature of the cell at thermal equilibrium, to compensate for aging effects of the cell.

12. The apparatus of claim 1, further including the plurality of battery cells connected in series, and a pack controller configured and arranged to control operation of each of the battery cells for providing an output current based upon the indication of the temperature characteristic.

13. An apparatus comprising:
    a zero crossing detection circuit configured and arranged to, for each of a plurality of battery cells, detect an intercept frequency at which an imaginary part of a plot of impedance values of the battery cell exhibits a zero crossing, the impedance values corresponding to current injected into the cell; and
    a temperature detection circuit configured and arranged to, for each of the battery cells, determine a temperature the cell based upon the detected intercept frequency for the cell and stored data that models operation of the cell.

14. The apparatus of claim 13,
further including a current injection circuit configured and arranged to inject the current into the cell at different frequencies, and
wherein the zero crossing detection circuit is configured and arranged to detect the intercept frequency by interpolating respective impedance values of the cell detected in response to the injection of the current at the different frequencies.

15. The apparatus of claim 13,
further including a current injection circuit configured and arranged to concurrently inject current signals into the cell at different frequencies based upon an intercept frequency previously-detected by the zero crossing detection circuit, the different frequencies including a frequency that is higher than the previously-detected intercept frequency and a frequency that is lower than the previously-detected intercept frequency,
wherein the zero crossing detection circuit is configured and arranged to detect the intercept frequency by interpolating respective impedance values of the cell detected in response to the injection of the current at the different frequencies, and
further including a controller configured and arranged to use the determined temperature of each cell to control at least one of charging, discharging, and drawing energy from each of the plurality of battery cells.

16. A method for detecting temperature in a battery apparatus having a plurality of battery cells, the method comprising, for each battery cell:
detecting an intercept frequency at which an imaginary part of a plot of impedance values of the battery cell exhibits a zero crossing, the impedance values corresponding to current injected into the cell; and
determining a temperature of the cell based upon the detected intercept frequency for the cell and stored data that models operation of the cell.

17. The method of claim 16,
further including injecting the current into the cell at different frequencies, and
wherein detecting the intercept frequency includes interpolating respective impedance values of the cell detected in response to the injection of the current at the different frequencies.

18. The method of claim 16,
further including injecting current signals into the cell at different frequencies based upon a previously-detected intercept frequency, the different frequencies including a frequency that is higher than the previously-detected intercept frequency and a frequency that is lower than the previously-detected intercept frequency,
wherein detecting the intercept frequency includes interpolating respective impedance values of the cell, detected in response to the injection of the current at the different frequencies.

19. The method of claim 18, further including using the determined temperature of each cell to control at least one of charging, discharging, and drawing energy from each of the plurality of battery cells.

20. The method of claim 16, wherein detecting the intercept frequency includes
measuring the cell impedance at a first frequency,
in response to an imaginary part of the impedance being positive, measuring the cell impedance at a frequency higher than the first frequency,
in response to the imaginary part of the impedance being negative, measuring the impedance of the cell at a frequency that is lower than the first frequency,
repeating the steps of measuring and responding to the imaginary part of the impedance until the imaginary part of impedance is about zero, and therein detecting a zero crossing point at the frequency at which the imaginary part of impedance is about zero.

* * * * *